Patented Apr. 22, 1924.

1,491,408

UNITED STATES PATENT OFFICE.

RUDOLPH A. KUEVER, OF IOWA CITY, IOWA, ASSIGNOR TO THE PEPSODENT COMPANY, OF CHICAGO, ILLINOIS, A CORPORATION OF ILLINOIS.

DENTIFRICE.

No Drawing. Application filed March 8, 1922. Serial No. 542,136.

*To all whom it may concern:*

Be it known that I, RUDOLPH A. KUEVER, a citizen of the United States, and a resident of Iowa City, in the county of Johnson and State of Iowa, have invented certain new and useful Improvements in Dentifrices, of which the following is a specification.

This invention relates to dentifrice and has for its object the production of a dentifrice of superior efficiency in operation and which is incapable of injuring the teeth.

As more fully described in a copending application, a dentifrice must be examined from two standpoints—its mechanical action and its chemical action. Considered mechanically its function is largely that of a polishing agent, and a polishing agent forms the bulk of the dentifrice. Considered chemically the most desirable dentifrice is one which produces an acid reaction and corresponding beneficial action in the mouth. Considering the relation of the two, the polishing agent should not interfere with an acid reaction in any way, either by combining with the acid in the dentifrice or by interfering with the resulting desired reactions in the mouth.

In the copending application referred to, I have fully described the salient desirable features of a polishing agent, with respect to inertness, hardness, solubility, etc., and have shown that anhydrous calcium sulphate completely satisfies each of these requirements.

Anhydrous calcium sulphate serves as a perfect polishing agent,—it is hard enough to so serve, yet much too soft to damage the teeth in any way; it is soluble so that particles lodge under the gum margins will be dissolved but insoluble enough to remain until after the polishing action is completed, and it is inert.

In this invention, in combination with anhydrous calcium sulphate I use a relatively large amount of fruit juices. These serve to stimulate a mark salivary flow which persists long after the teeth are brushed, and this increases salivary flow, completely and rapidly dissolves every particle of the polishing agent out of the mouth, so that within a very short time after the teeth are brushed, the polishing agent which stood up to its duty is completely dissolved, and no particle thereof remains to cause even temporary irritation under gum margins or elsewhere.

An illustrative embodiment of the invention is given in the following formula:

| | Parts. |
|---|---|
| Anhydrous calcium sulphate | 90 |
| Acid calcium phosphate (acidity) | 10 |
| Gums | 3 |
| Fruit juices (acidity) | 40 |
| Glycerin | 50 |
| Water | 10 |

Flavor, a sufficient quantity.

Of course these proportions may be varied within wide limits.

Having described my invention, I claim:—

A dentifrice comprising acid calcium phosphate and anhydrous calcium sulphate.

In witness whereof, I hereunto subscribe my name this 3rd day of March, A. D., 1922.

RUDOLPH A. KUEVER.